(12) United States Patent
Bruno et al.

(10) Patent No.: US 8,167,337 B2
(45) Date of Patent: May 1, 2012

(54) ELASTIC COUPLING FOR UNIVERSAL VACUUM EXTENSION KIT

(76) Inventors: Frank L. Bruno, Colorado Springs, CO (US); Marva L. Plummer-Bruno, Colorado Springs, CO (US)

( * ) Notice: Subject to any disclaimer, the term of this patent is extended or adjusted under 35 U.S.C. 154(b) by 1970 days.

(21) Appl. No.: 10/739,336

(22) Filed: Dec. 19, 2003

(65) Prior Publication Data

US 2005/0134037 A1   Jun. 23, 2005

(51) Int. Cl.
*F16L 21/00* (2006.01)
(52) U.S. Cl. ............................................. 285/235; 285/7
(58) Field of Classification Search .................. 285/260, 285/293.1, 295.4, 921, 417–419, 235, 7; 2/908–920; 128/DIG. 15
See application file for complete search history.

(56) References Cited

U.S. PATENT DOCUMENTS

| | | |
|---|---|---|
| 122,614 A | 1/1872 | Kearney |
| 2,122,633 A | 7/1938 | Baxter |
| 2,273,211 A | 2/1942 | Martinet |
| 2,460,851 A | 2/1949 | Sheppard |
| 2,801,437 A | 8/1957 | Okun |
| 3,185,197 A * | 5/1965 | Spiro et al. ..................... 150/154 |
| 3,306,634 A | 2/1967 | Groves et al. |
| 3,905,621 A | 9/1975 | DeMarco |
| 3,922,753 A | 12/1975 | Aberilla |
| 4,053,962 A | 10/1977 | McDowell |
| 4,112,967 A | 9/1978 | Withem |
| 4,142,565 A * | 3/1979 | Plunkett, Sr. .................. 150/156 |
| 4,301,920 A * | 11/1981 | Boggs ......................... 206/315.1 |
| 4,384,583 A * | 5/1983 | Speelman et al. ............ 606/203 |
| 4,409,035 A | 10/1983 | McElroy et al. |
| 4,930,543 A | 6/1990 | Zuiches |
| 5,137,508 A * | 8/1992 | Engman .......................... 602/79 |
| 5,146,932 A | 9/1992 | McCabe |
| 5,173,967 A * | 12/1992 | Carter ................................ 2/242 |
| 5,410,776 A | 5/1995 | Schneider |
| 5,439,456 A * | 8/1995 | Fabricant ....................... 604/327 |
| 5,488,738 A * | 2/1996 | Seamans ............................ 2/69 |
| 5,505,500 A | 4/1996 | Webb et al. |
| 5,555,584 A * | 9/1996 | Moore et al. ................. 12/142 N |
| 5,678,598 A * | 10/1997 | Helmsderfer ................. 137/375 |
| 5,693,401 A | 12/1997 | Sommers et al. |
| 5,720,712 A * | 2/1998 | Joy et al. ........................... 602/3 |
| 5,823,977 A * | 10/1998 | Dalyea .............................. 602/3 |
| 5,879,029 A * | 3/1999 | Wilks ................................ 285/8 |
| 6,156,001 A * | 12/2000 | Frangi et al. .................... 602/75 |
| 6,156,140 A * | 12/2000 | Ayres ............................. 156/66 |
| 6,168,583 B1 * | 1/2001 | Tanji et al. ................ 604/385.14 |
| 6,223,400 B1 | 5/2001 | Lenack |
| 6,295,704 B1 * | 10/2001 | Rivas ........................... 24/712.1 |
| 6,301,755 B1 | 10/2001 | Gaber |
| 6,346,654 B1 * | 2/2002 | Snyder ............................. 602/56 |
| 6,440,116 B1 * | 8/2002 | Tanji et al. ................ 604/385.19 |
| 6,652,461 B1 * | 11/2003 | Levkovitz ..................... 600/443 |
| 6,739,353 B2 * | 5/2004 | Lechuga ........................ 137/375 |
| 6,820,639 B2 * | 11/2004 | Petschek ....................... 137/382 |
| 6,834,396 B2 * | 12/2004 | Franco-Sion .................... 2/102 |
| 6,846,254 B2 * | 1/2005 | Baxter .......................... 473/450 |
| 6,998,159 B2 * | 2/2006 | Van den Bergh et al. .... 428/35.8 |
| 7,007,325 B1 * | 3/2006 | Gomeh ............................ 5/496 |

* cited by examiner

*Primary Examiner* — Aaron Dunwoody
(74) *Attorney, Agent, or Firm* — Clyde I. Coughenour

(57) ABSTRACT

A quick-release, fluid impervious elastic coupling with hook and loop strips conforms to the shape of conduit ends to join, seal and secure together conduits that can have different diameters. The elastic sheet can be a single or multiple layers and can be reinforced with strengthening ribs or cords and/or provided with gripping ridges to assist securing and sealing the conduits against leakage.

14 Claims, 3 Drawing Sheets

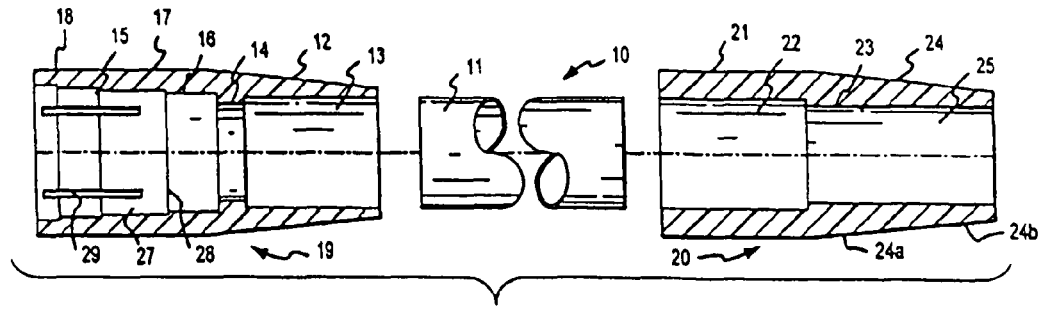
FIG.1
PRIOR ART
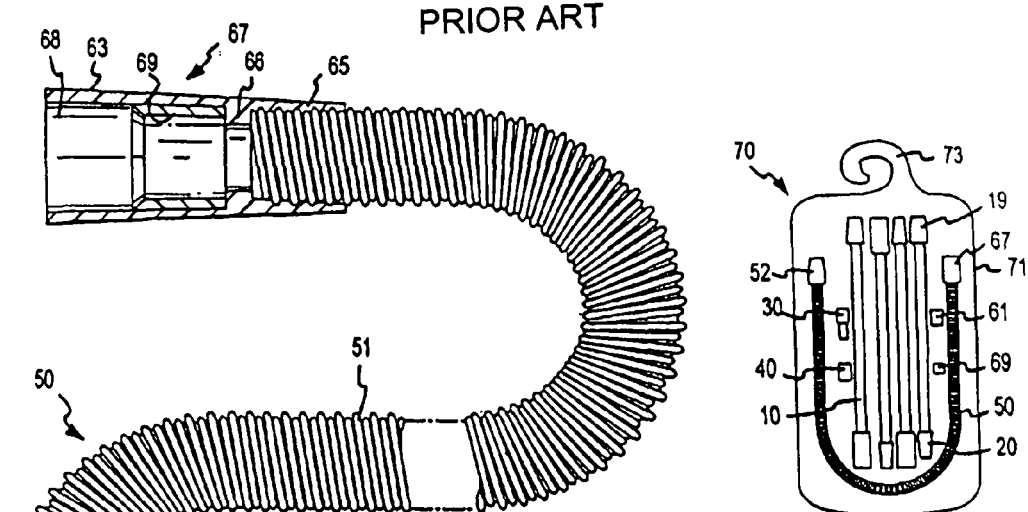
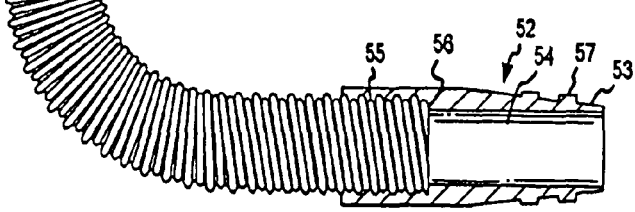
FIG. 3
PRIOR ART
FIG.2
PRIOR ART

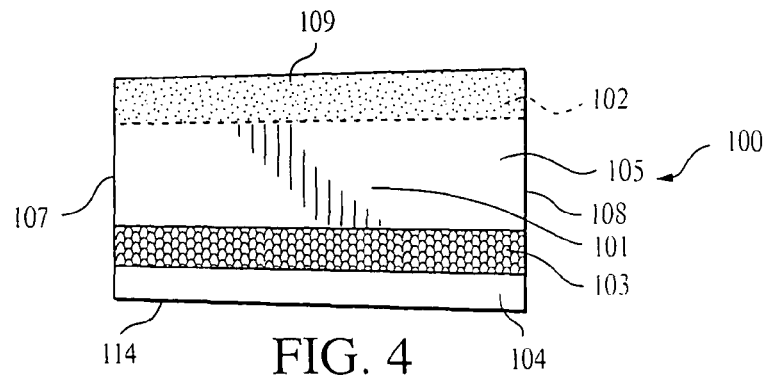
FIG. 4
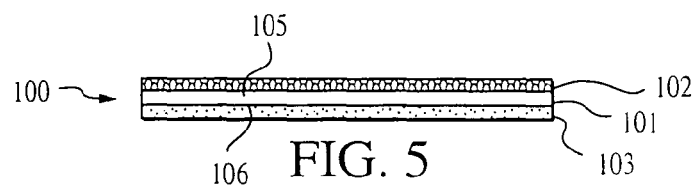
FIG. 5
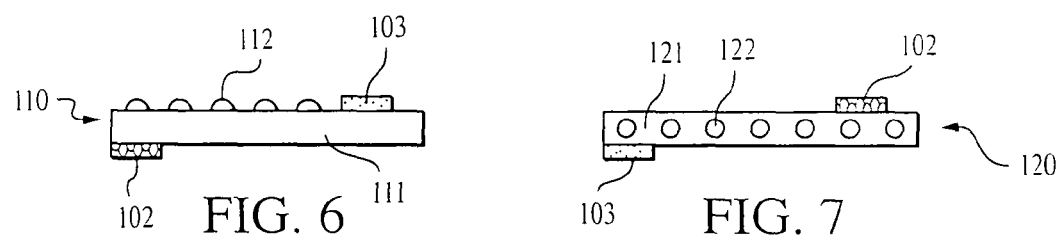
FIG. 6
FIG. 7
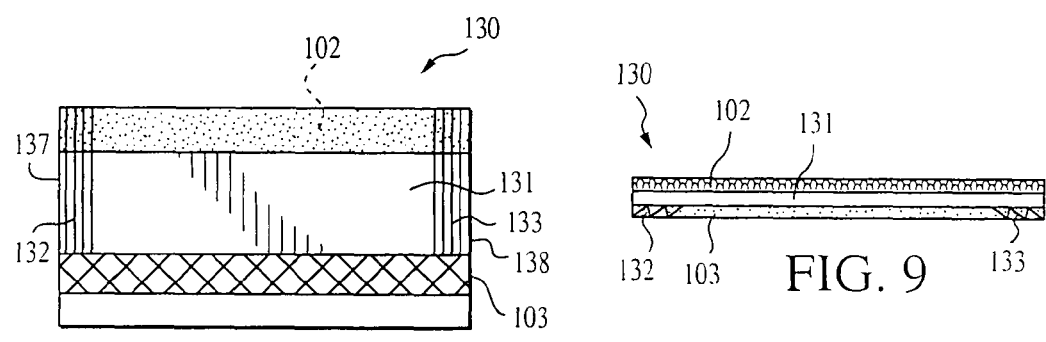
FIG. 8
FIG. 9

# ELASTIC COUPLING FOR UNIVERSAL VACUUM EXTENSION KIT

BACKGROUND OF THE INVENTION

1. Field of the Invention

A universal vacuum cleaner extension kit extends the reach of standard cleaners by using a fluid impervious elastic coupling that can join different diameter conduits or integral tubes having tapered male and/or female ends.

2. Description of Related Art

Most vacuum cleaners come with some sort of extension and replacement parts. These prove to be satisfactory for the standard rooms, but do not meet the needs for high locations such as high ceilings, vaulted ceilings, high windows, and high foyers. Frequently available tubes do not have the same diameter so that different manufacturers units cannot be joined together.

In the vacuum cleaner art, extensions are well known for reaching heights and for extending the horizontal reach from the collection cannister or bag. There is no universally accepted standard for tubing or connectors. However, most tubing and connectors used with vacuum cleaners vary from 1¼ inches to 1½ inches in diameter. B. Baxter (U.S. Pat. No. 2,122,633, issued 5 Jul. 1938) is an example of tubular extension sections having locking couplings between the sections. N. Okun (U.S. Pat. No. 2,801,437, issued 6 Aug. 1957) teaches a tapered male and female coupling; N. Schneider (U.S. Pat. No. 5,410,776, issued 2 May 1995) teaches small tapers for frictionally securing parts of vacuum attachments to extension tubes; and, R. McDowell (U.S. Pat. No. 4,053, 962, issued 18 Oct. 1977) teaches several stepped and tapered inner surfaces for forcefully attaching a tubular vacuum cleaner section to various size nozzles, such as 1¼ and 1½ inch external diameter nozzles.

Elastic elements have been used with vacuum and air conducting conduits for various purposes. As examples, E. Martinet (U.S. Pat. No. 2,273,211, issued 17 Feb. 1942) seals air leakage by covering a joint coupling with a one-piece rubber sleeve. W. Sheppard (U.S. Pat. No. 2,460,851, issued 8 Feb. 1949) joins a connector to a bag using a molded rubber sleeve that is slightly less than the outside diameter of a tubular connector to frictionally grip it. M. Groves et al (U.S. Pat. No. 3,306,634, issued 28 Feb. 1967) uses an elastic molded sleeve to make a joint air tight with cylindrical tubular front and rear ends and a corrugated central section. W. Aberilla (U.S. Pat. No. 3,922,753, issued 2 Dec. 1975) uses stretchable elongated tubes over the ends of rigid tubes for rapid joining and sealing with different diameter rigid tubes joined by using a short length collar between the smaller diameter connector and the stretchable elongated tube.

The use of elastic or resilient rings for joining pipes subject to movement (U.S. Pat. No. 122,614, issued 9 Jan. 1872 to W. Kearney) and unequal diameters (U.S. Pat. No. 3,905,621, issued 16 Sep. 1975 to T. De Marco) and as a valve cover releasably secured in place by Velcro® fasteners (U.S. Pat. No. 4,112,967, issued 12 Sep. 1978 to R. Withem) as an adjustable, flexible clamp secured by Velcro® fasteners (U.S. Pat. No. 4,409,035, issued 11 Oct. 1983 to McElroy et al) and as a Velcro-secured protective hose cover (U.S. Pat. No. 4,930,543, issued 5 Jun. 1990 to E. Zuiches) as a truncated fluid emission seal with Velcro® securing (U.S. Pat. No. 5,505,500, issued 9 Apr. 1996 to Webb et al) are old.

Velcro® attached, stretched elastic for garments is taught by F. Gaber (U.S. Pat. No. 6,301,755, issued 16 Oct. 2001) and F. McCabe (U.S. Pat. No. 5,146,932, issued 15 Sep. 1992). Sommers et al (U.S. Pat. No. 5,693,401, issued 2 Dec. 1997) discusses in detail the elastic used in elastic strips used to hold surgical gloves in place with hooks and loops securing their ends together. This patent is incorporated herein by reference.

SUMMARY OF THE INVENTION

The coupling basically consists of an elastic sheet that can be a square, rectangle or trapezoid provided with a hook and loop securing along two sides. The hook strip can be fairly narrow along one edge and the loop strip fairly wide along the opposite edge to provide maximum adjustment. The loops are preferably on the upper surface and the hooks on the lower surface. The coupling provides sealing and securing.

The elastic sheet can be provided with reinforcement ribs and/or internal strands that have a minimal restriction on the elasticity needed to join different diameter (or size) conduits yet provide maximum strength or stretch direction control. The elastic coupler, when stretched over two extensions or two hoses or a combination of the two, normally provides enough friction to secure the two together. For additional holding strength, ridges that run parallel to the edges can be formed to provide parallel pressure and sealing lines against leakage.

The present invention is to components that attach to most cannister and upright vacuums. To meet the special needs for extending the reach of vacuum cleaners, this invention can provide extensions with selective, decreasing uninterrupted internal diameters to selectively increase velocity within the extensions for improved removal of dust, cobwebs and insects, an elastic adapter joins hose extensions to different size connectors.

There can be four to six extensions provided in the kit. Each extension can have a male and a female end connector with tapered surfaces that allow for easy slip-fit attachment to each other. The average height person with four three-foot extensions or six two-foot extensions can reach about seventeen feet in height. This allows a person to stand on one floor and vacuum the ceiling and corners of an above floor or a $2^{nd}$ level.

Extensions having a tapered expanding opening on one end and a tapered contracting opening on the other end are provided. There is a coupling provided for connecting the extensions to existing vacuum hoses, attachments, and pipes. It is primarily used to attach extensions to vacuum units having different diameter conduits. For additional flexibility an adjustable diameter elastic adapter can be used for coupling odd-sized connectors. By stretching the adapter to fit over connector ends, odd size connectors can be joined together.

BRIEF DESCRIPTION OF THE DRAWINGS

FIG. 1 is a prior art exploded view of an extension conduit with parts shown separated and with sectional views of the end connectors.

FIG. 2 is a prior art view of a hose extension with the end connectors shown in section.

FIG. 3 is a front view of a prior art container housing the components of an extension kit.

FIG. 4 is a top view of the elastic coupling.

FIG. 5 is a side view of the elastic coupling of FIG. 4.

FIG. 6 is an end view of a first modified elastic coupling.

FIG. 7 is an end view of a second modified elastic coupling.

FIG. 8 is a front view of a third modified elastic coupling.

FIG. 9 is a side view of the third modified elastic coupling.

DESCRIPTION OF THE PREFERRED EMBODIMENT

Figure 10:
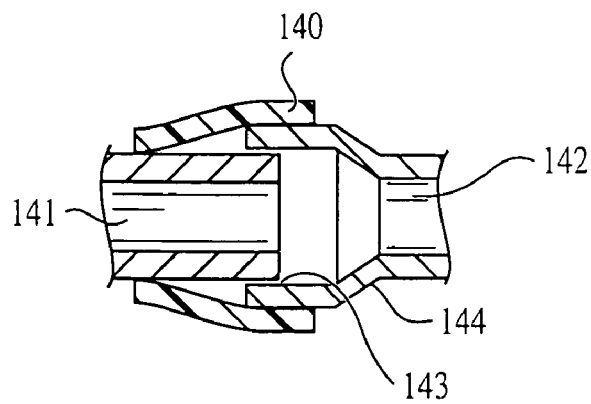
FIG. 10 is a longitudinal sectional view representation of two conduits secured together with an elastic coupling.

FIG. 1 shows an extension 10 having an elongated tube 11 with female connector 19 and male connector 20. The elongated tube has a wall thickness sufficient to make it self-supporting and capable of supporting an accessory (i.e. tool implement, etc.), other extensions, and the moderate lateral pressures used against surfaces to be cleaned. If stainless steel is used, a wall thickness of 0.01 to 0.02 inches has been found sufficient with ¾ to 1 inch diameter tubes. The female connector 19 is provided with a cylindrical opening 13 in a first end 12 to receive one first end of the elongated tube 11 with a tapered wall thickness that increases inwardly. A stop 14 is formed by having the wall thicker at a central inner location for locating the end travel of the elongated tube and strengthening the connector between the elongated tube and receiving first end 12 and an element held within the cavity 27 of the female connector second end 18. The connector second end has an inwardly decreasing diameter that can have a uniform taper, or be stepped 28, or a combination of the two, to receive standard diameter accessories or elements, or to be attached to the male end 52 of the flexhose or extensions. The inside diameter at the end 15 can be about 1½ inches, at the middle 17 1⅜ inches, and at the base 16 1¼ inches.

The male connector 20 includes a first end 21 having a cylindrical opening 22 that receives a second end of the elongated tube 11. A thicker wall 23 with a slightly smaller internal diameter 25 at the base of the cylindrical opening 22 acts as a stop for the elongated tube. The second end 24 of the male connector 20 is provided with a modest external taper that gives a slightly larger outside diameter 24a at the central area and a slightly smaller outside diameter 24b on the second end. The outside taper is also designed to engage a female connector of another extension or standard accessory or the adapter 30 so as to attach to smaller accessories.

The extensions can be made from various metal and plastic materials that offer strength, rigidity and light weight. Since the assembled extension must be strong enough to be essentially self supporting, stainless steel tubing is preferred. Most plastics have been found to be too flexible, heavy and hard to control. The end connectors or fittings are preferably ABS plastic attached to the tubing with a high strength adhesive such as CA-50 GEL sold by 3M Corporation. A ¾ to 1 inch diameter tube has about 0.44 to 0.79 square inch of flow area, while a 1¼ to 1½ inch diameter tube has about a 1.2 to 1.8 square inch flow area. By using tubes having a diameter of from ¾ to 1 inch, the velocity within the tube is increased by about 200% and the overall weight that must be manipulated is reduced.

The end connectors or fittings are somewhat larger or thicker than those that are used in the prior art. This is to accommodate the smaller diameter tube yet allows it to fit larger diameter accessories found on some vacuum cleaner hoses and conduits. They also join the tubes such that an uninterrupted flow path extends through the tubes, when they are joined together, and gives the extensions a rigid support.

The female connectors, on their inner surfaces, and the male connectors, on their outer surfaces, can be provided with irregularities such as ridges or recesses around their circumferences or longitudinally. It has been found that a smooth surface male connector placed inside a smooth surfaced female receptor has such a hold that it is very difficult to pull them apart. This could be from a vacuum type hold created between the two. To overcome this problem, it has been found that ridges or recesses around the circumference or longitudinally on these surfaces provide the necessary grip for securing the two together while giving a reasonably easy release of the two. This use is illustrated as longitudinal recesses 29 inside female connector 19 of the extension 10 shown in FIG. 1 and as circumferential ridges 57 on male connector 52 of the flexible hose 50 shown in FIG. 2. The preferred size of these irregularities is from 0.01 to 0.02 inches in height and up to 0.12 inches in width that extend from 1 to 1½ inches in length. The irregularities can be rectangular or rounded and may be tapered along their length in any given area they are used at. The recesses and ridges are designed into the connector so as to not let air in and/or the mating connectors are designed to make contact circumferentially and the inner and/or outer end of the connectors to block air leakage.

FIG. 2 shows a hose extension 50. The hose extension has a flexible hose 51 with an inside diameter of about 0.75 inch having a male hose connector 52 on one first end and a female hose connector 67 on the second end. The male hose connector 52 has a threaded internal recess 55 for threading in the first end of the hose although it can be permanently bonded or molded in place. A hose stop 56 limits the distance the hose can be threaded into the male hose connector. The second end of the hose connector has a tapered outer surface 53 for placement in the female connector 19 of the extension 10. As an alternative, attachments can be directly connected onto the tapered outer surface 53. The male hose connector second end has an internal passage 54 that is essentially the same diameter as the extension passage diameter.

The hose extension 50 female hose connector 67 on the hose extension second end has a threaded first end 65 that receives the hose until a stop 66 is engaged. The female hose connector second end 63 has a taper 68 with a decreasing internal diameter going from the second end toward the first end. The second end taper is designed to receive the male connector end of the vacuums. An internal recessed insert 69 can be temporarily or permanently placed within the taper 68 of the connector second end 63 if necessary to fit other vacuum cleaners with smaller connectors. The internal recessed insert reduces the diameter of the tapered recess 68 from about 1.16 to 0.09 inches. The outside diameter of the second end 63 is approximately 1.5 inches which will fit onto vacuum extensions that are larger. The plastic or rubber used to make the elements, such as the female connector 67, has enough resilience to expand or contract to accommodate slight differences existing between some vacuum cleaners.

FIG. 3 shows the parts of the extension assembled in a container 70 for transport and storage. The kit contains from four to six extensions 10 each with a male connector 20 and female connector 19; a hose extension 50 with a male connector 52 and a female connector 67; a first adapter 30; a clog preventer 40; an outer internal insert 61; and an internal recessed insert 69 packaged as a unit. The container 70 is in the form of a clear plastic "clamshell," vacuum formed to house the parts of the kit for transport and storage. The clamshell container securely holds the parts that fit into a molded area storage compartment in a back side 71. A cover on the front side is connected to the back side by a living hinge on the bottom side of the container. The back side and front side are removably secured together by a hanger type hook 73 on the top side. The portion of the hanger on the back side 71 and front side cover snap fit together to removably hold the cover in place over the back side. The hook allows the clamshell container 70 to be placed on a closet pole or hook for easy storage and forms a grip for transport.

An elastic adapter can be used for unusual or odd sized connectors. The elastic adapter can be of a single layer or multiple layers in any of the known forms so long as it is stretchable and impervious to fluids. By providing an elastic adapter an essentially straight tube can be used as an adapter that can be compressed some, to fit within female connectors, and stretched, to fit over the outside diameter of larger connectors. The elastic adapter can be used to join male connectors together and can be stretched over the outside of connectors intended to be joined with a male connector. The elastic adapter can be manufactured less expensively yet fulfill the need to join components without fluid leakage.

The elastic coupling 100 of FIGS. 4 and 5 are shown with a first hook-loop strip 102 on a bottom or back side 106 of an elastic sheet 101 and a second hook-loop strip 103 on the top surface 105. The hook and loop strips extend from a first end 107 to a second end 108 with the first hook loop strip extending inwardly from a first edge and the second hook loop strip recessed from a second edge by an edge clearance 104.

The first hook loop strip 102 is wide enough to provide necessary holding power, usually from ⅛ to ¾ inch. The second loop hook strip 103 is wide enough to allow the elastic coupling to be stretched over different diameter conduits, usually ¼ to 4 inches, and recessed so as to provide an end clearance of ⅛ to ½ inch 104. The end clearance allows the second edge 114 to contact the bottom surface 106 of the elastic sheet 101 to form a seal. The first end 107 can be made shorter than the second end 108 so that the elastic coupling ends can be wrapped around different diameter conduits but still have the hook loop securing. The thickness of the elastic sheet depends on the elastic material used and the strength necessary to secure the conduits together, usually 1/16 to ½ inch with a stretch of from 10 to 100 percent beyond its relaxed at rest size. The frictional coefficients of the elastic sheets and pressure created by stretching the sheets over the conduits ends normally create enough holding power to prevent inadvertent separation of the conduits.

FIG. 6 is a side view of a first modified elastic coupling 110 provided with longitudinally extending ribs 112 on the top of the elastic sheet 111 to strengthen the elastic coupling.

FIG. 7 is a side view of a second modified elastic coupling 120 provided with longitudinally extending embedded strengthening cords 122 within the elastic sheet 121 to strengthen the elastic coupling.

FIG. 8 is a front view of a third modified elastic coupling 130 provided with gripping ridges 132, 133 that add sealing gripping lines that add to the sealing and gripping forces provided by the elastic sheet 131. The gripping ridges extend laterally to the hook and loop strips on the top surface of the elastic sheet 131. The first end ridges 132 on the first end 137 of the elastic sheet 131 preferably have a flat face that is perpendicular to the elastic sheet facing outward with a back face that tapers inwardly as best seen in front side view FIG. 9. The second end ridges 133 on the second end 138 of the elastic sheet are similar to those on the first end but preferably have a flat outwardly facing front face perpendicular with the back face of the elastic sheet with a back face that tapers inwardly. The ridges are preferably from 0.005 to 0.015 inch high and an integral part of the elastic sheet 131.

Figure 11:
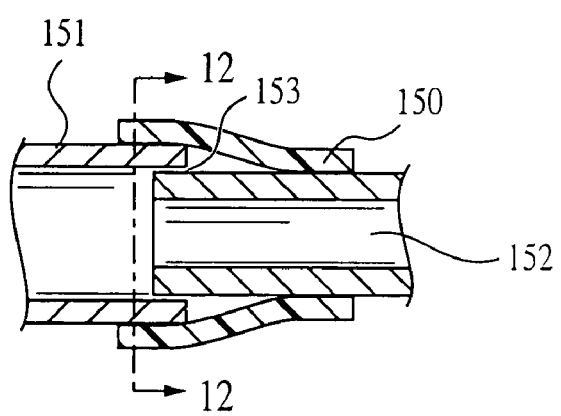
FIG. 11 is a longitudinal sectional view representation of two conduits of different diameter secured together with an elastic coupling.
Figure 12:
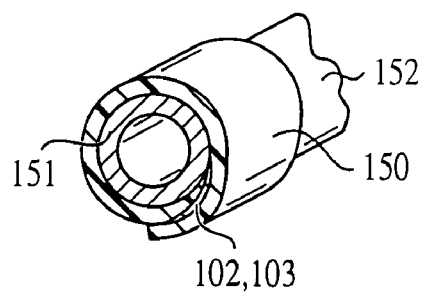
FIG. 12 is a perspective view of an elastic coupling securing two conduits together.

FIGS. 10, 11 and 12 depict conduits secured together by an elastic coupling.

FIG. 10 is a side sectional view of an elastic coupling 140 that is stretched over a first conduit 141 and a second conduit 142 with the second conduit end 144 expanded to extend over the first conduit 141 with a slight mismatch 143 but providing a uniform diameter passage between the two conduits.

FIG. 11 is a side sectional view of an elastic coupling 150 that is stretched over a first conduit 151 and a second conduit 152. The conduits have straight ends with a mismatch 153.

FIG. 12 is a cross-sectional perspective view along the section lines 12-12 of FIG. 11. The elastic coupling 150 is stretched over the conduits 151 and 152 and are held in the stretched condition by hook and loop fasteners 102, 103. To provide for adequate holding the length of the elastic sheet edges need to be at least one inch long with ½ inch extending over each conduit although one to three inches or more may be necessary for securing large diameter conduits together. The ends of the elastic sheet need to be stretched far enough apart to overlap each other and engage the hooks and loops for securing the conduits together. For the size conduits generally employed, ends with a two inch minimum length are required so that in the stretched configuration an overlap of an inch or two is achieved resulting in an overlap of the hooks and loops sufficient to adequately secure the elastic coupler to hold the conduits together.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

The invention claimed is:

1. A quick-release elastic coupling for deformably joining different diameter vacuum extensions comprising:
   an elastic sheet impervious to fluid transfer having a top surface, a bottom surface, a first end, a second end, a first edge and a second edge;
   said elastic sheet having a relaxed unstretched at rest size and shape that can be elongated into a stretched configuration;
   a first strip of hook-loop fasteners extending along and adjacent said first edge on said bottom surface;
   a second strip of hook-loop fasteners extending along and adjacent said second edge on said top surface;
   said first edge and said second edge being at least one inch long and long enough to extend over the ends of first and second respective adjoining conduits with at least ½ inch extending over the exposed extent of each conduit;
   said first end and said second end being at least two inches long and long enough to extend around the circumference of respective first and second adjoining conduits with at least a one inch overlap in the stretched configuration;
   said elastic sheet being stretchable to conform to the shape of vacuum extension conduits to secure and seal their ends together.

2. A quick-release elastic coupling for deformably joining different diameter vacuum extensions as in claim 1 wherein:
   said second strip of hook-loop fasteners is recessed in from said second edge to provide a clearance between said second strip of hook-loop fasteners and said second edge to provide for sealing contact between said second edge and conduits.

3. A quick-release elastic coupling for deformably joining different diameter vacuum extensions as in claim 1 wherein:
   said first end is longer than said second end to provide for joining conduits of different diameter.

4. A quick-release elastic coupling for deformably joining different diameter vacuum extensions as in claim 1 wherein:

said first hook-loop fastener strip is twice as wide as said second hook-loop fastener strip.

5. A quick-release elastic coupling for deformably joining different diameter vacuum extensions as in claim 1 wherein:
said elastic sheet can be stretched by 10 to 100 percent beyond its relaxed at rest size;
said elastic sheet top surface is provided with strengthening ribs that extend parallel to said second hook-loop strip.

6. A quick-release elastic coupling for deformably joining different diameter vacuum extensions as in claim 1 wherein:
said elastic sheet is provided with internal strengthening cords that extend parallel to said second hook-loop strip.

7. A quick-release elastic coupling for deformably joining different diameter vacuum extensions as in claim 1 wherein:
said elastic sheet is provided with gripping ridges that extend on said elastic sheet top surface perpendicular to said second hook-loop strip.

8. A quick-release elastic coupling for deformably joining different diameter vacuum extensions as in claim 7 wherein:
said gripping ridges have faces on the first and second ends that are perpendicular to the elastic sheet top surfaces with faces that slope toward said elastic sheet top surface toward a central area of said elastic sheet top surface.

9. A quick-release elastic coupling for deformably joining different diameter vacuum extensions as in claim 1 wherein:
said first hook-loop strip has a width of from $1/8$ to $3/4$ inch;
said second hook-loop strip has a width of from $1/4$ to 4 inches.

10. A quick-release elastic coupling for deformably joining different diameter vacuum extensions as in claim 1 wherein:
said elastic sheet has a thickness of $1/16$ to $1/2$ inch and a stretch of 10 to 100 percent beyond its relaxed at rest size.

11. A quick-release elastic coupling for deformably joining different diameter vacuum extensions as in claim 7 wherein:
said ridges extend 0.005 to 0.015 inches above said top surface of said elastic sheet.

12. A quick-release elastic coupling for deformably joining different diameter vacuum extensions as in claim 2 wherein:
said elastic sheet can be stretched by 10 to 100 percent beyond its relaxed at rest size;
said elastic sheet top surface is provided with strengthening ribs that extend parallel to said second hook-loop strip;
said first hook-loop strip has a width of from $1/8$ to $3/4$ inch;
said second hook-loop strip has a width of from $1/4$ to 4 inches.

13. A quick-release elastic coupling for deformably joining different diameter vacuum extensions as in claim 2 wherein:
said first hook-loop strip has a width of from $1/8$ to $3/4$ inch;
said second hook-loop strip has a width of from $1/4$ to 4 inches;
said elastic sheet has a thickness of $1/16$ to $1/2$ inch and a stretch of 10 to 100 percent beyond its relaxed at rest size.

14. A quick-release elastic coupling for deformably joining different diameter vacuum extensions as in claim 13 wherein:
said elastic sheet is provided with gripping ridges that extend on said elastic sheet top surface perpendicular to said second hook-loop strip.

* * * * *